United States Patent Office 2,904,475
Patented Sept. 15, 1959

2,904,475

PROCESS FOR SEPARATING BENZENE HEXACHLORIDE, HYDROCHLORIC ACID, AND AN ALCOHOL BY DISTILLATION

Thomas Robert Bell III, Devon, Pa., assignor to Pennsalt Chemicals Corporation, a corporation of Pennsylvania No Drawing. Application January 14, 1957
Serial No. 633,828

9 Claims. (Cl. 202—56)

This invention is directed to the recovery of benzene hexachloride from benzene hexachloride methanol mixtures contaminated with hydrochloric acid whereby the acid is separated from the benzene hexachloride after removing the methanol by distilling the mixture in the presence of water. The process avoids or minimizes the release of additional amounts of hydrochloric acid and transfers the hydrochloric acid from the benzene hexachloride to an aqueous layer which can thereafter be discarded.

Manufacturing processes in general for the production of benzene hexachloride usually involve a process step wherein benzene hexachloride is maintained in a molten condition for a considerable length of time. This heating of the benzene hexachloride usually produces hydrochloric acid with accompaniment disoloration of the product. Such a process condition usually occurs when excess benzene is removed from a solution of benzene and benzene hexachloride, a solution which usually occurs in the production of the crude material. It is not exactly understood what causes the decomposition of the benzene hexachloride, but its concomitant release of hydrochloric acid and product discoloration may be due to the presence of small amounts of iron which catalyze the decomposition of the benzene hexachloride. The iron contamination may be brought into the processing system by contamination of the raw materials being used such as benzene or chlorine, or from corrosion of the process equipment itself.

Many attempts have been made to minimize and to prevent the formation of hydrochloric acid and the discoloration of benzene hexachloride in the final benzene hexachloride product. One such purification process heretofore used provides for the scrubbing of benzene hexachloride in a solvent or in a molten condition with aqueous caustic solutions. This process is usually effective in the elimination of the hydrochloric acid but it has the disadvantage in that it introduces another foreign element into the system and also increases the cost of the final product. Moreover, it is known that the use of caustic solutions, particularly at high temperatures in the presence of benzene hexachloride, will cause or accelerate dehydrochlorination of benzene hexachloride with further loss of product and also added discoloration of product.

Another attempt to solve the problem of the presence of hydrochloric acid in benzene hexachloride solutions is that of Governale as described in U.S. Patent 2,755,235. The patentee in his process adds an amine to the benzene solution of benzene hexachloride prior to recovery and thereafter vaporizes the benzene solvent leaving the benzene hexachloride. In a preferred form of the patentee's process the amine is dissolved in the reactor solution prior to the recovery operation in a certain proportion relative to the deteriorating impurities in the said solution, one of the factors being dissolved iron. Generally, the patentee uses about 5–25 parts by weight of the amine to that of the iron present. However, the use of amines as a suppressor of hydrochloric acid and product discoloration has not had widespread acceptance and appears to be of limited use as noted by the patentee himself wherein he states that: "Under some conditions the amine additive may itself be a contributing factor to product deterioration." The cost of the amine too is another factor to be considered in this case.

Another patentee, Thomas et al., in U.S. Patent 2,486,688 has attempted to improve the odor of benzene hexachloride by holding benzene hexachloride in a molten condition for a considerable length of time and alternatively by passing an inert gas through the molten benzene hexachloride until the evolution of acrid vapors from the bath is complete. It is not believed that this process has found widespread acceptance since it is known that holding benzene hexachloride in a molten condition for any length of time accelerates the decomposition of the benzene hexachloride itself with concomitant discoloration of the product and release of hydrochloric acid.

In the variation of the above process Thomas, in Canadian Patent 493,566 teaches that benzene hexachloride is deodorized by heating it in the presence of an oil until volatile vapors are evolved. In this process it is believed that the contamination due to the presence of the oil would be more of a problem than the elimination of the odor itself. In any event there is no claim to improvement in the amount of byproduct hydrochloric acid being eliminated.

Another patentee, Dansker in Canadian Patent 500,742 discloses the use of metal nitrates in benzene hexachloride-alcohol-solutions to prevent corrosion of the processing equipment by suppressing release of hydrochloric acid. The importance of the control of hydrochloric acid and benzene hexachloride processing stream is shown by Dansker wherein he says that the use of his nitrated solutions permits the use of types 18–8, 304 and 316 stainless steels which without his treatment would be severely corroded by the solutions being carried. While Dansker would appear to have disclosed an inexpensive means of inhibiting corrosion of materials used in processing benzene hexachloride methanol solutions, there are certain difficulties involved in his process. For example, it is necessary that in the nitrated solutions a concentration of at least 0.5 to 2.0 weight percent of a metal nitrate be maintained. This requires careful control of the solutions being treated and in addition, requires the expense of adding a metal nitrate to the processing solutions.

Still another patentee, in British Patent 745,487 has attempted the purification of benzene hexachloride by heating the crude product in the presence of a phosphorus compound.

In contrast to the many and varied attempts to control product color, odor and the release of hydrochloric acid as a part of the benzene hexachloride purification process I have now found a simple procedure to accomplish the same effects without the disadvantages attending the introduction of a foreign material. I have found that merely by the use of added water benzene hexachloride processing can be facilitated and that further acid is not released from the benzene hexachloride and that any acid already present is transferred from the benzene hexachloride to the water which can thereafter be discarded without loss of any valuable material. What is most surprising about my new process is that it is contrary to all the experience heretofore recommended in the benzene hexachloride art. For example, Governale stated in his U.S. Patent 2,755,235 starting on column 1, line 72:

"It is well known that the presence of aqueous material when chlorinated materials are treated at a high temperature promotes or at least facilitates the decomposition of portions of such material and the concurrent release of hydrogen chloride which in turn contributes to rapid corrosion of equipment and so to product deterioration."

My process consists broadly of adding water to a benzene hexachloride methanol solution and bringing the mixture after the water has been added to a distilling temperature and removing the methanol as a vapor from the said distilling mixture. Afterwards, the distillation is discontinued, and the residual still liquors are allowed to separate into an aqueous acid layer and a benzene hexachloride layer. The acid-water layer is withdrawn from the mixture of the benzene hexachloride and acid water leaving benzene hexachloride which is substantially acid-free.

This process has the advantage that the purification of the benzene hexachloride is accomplished merely by the use of water which is a relatively inexpensive treating agent. Another advantage of my process is that the product color of the benzene hexachloride is very much improved. Whereas untreated benzene hexachloride may be gray in color, after treatment with my process it is a sparkling white. However, the most important use of my process is the removal of hydrochloric acid from the benzene hexachloride. Failure to remove this residual hydrochloric acid will result in a product which is generally unacceptable to the trade. Moreover, the removal of the hydrochloric acid from the alcohol stream will allow the alcohol to be recycled and reused without damage to the processing equipment or contamination of the benzene hexachloride. Residual hydrochloric acid in benzene hexachloride product will corrode nearly all containers carrying the benzene hexachloride and the acid will cause serious corrosion of processing equipment used in spraying benzene hexachloride solutions and slurries, as for example in insecticide sprays. Another advantage of treating benzene hexachloride by my process is to remove the hydrochloric acid is that the residual benzene hexachloride is of improved stability and no longer tends to release further hydrochloric acid.

Most processes for producing a high gamma content benzene hexachloride either employ crystallization or extraction processes using methanol or ethanol as solvents. My invention provides a means of eliminating acidity when encountered in the methanol and ethanol solutions and prevents the carry-over of hydrochloric acid into processes of acidic materials formed during evaporation processes. Surprisingly, the benzene hexachloride product resulting from the use of my process is lighter in color than that formed by means of conventional evaporation processes and the product itself is nearly acid free.

In a variation of my process it is possible to treat benzene hexachloride which has been isolated by conventional means and which is acidic and dark in color. By treating this material in accordance with my process it is considerably lightened in color and freed of acidity by dissolving it in alcohol and then isolating it by means of my invention.

My invention consists of adding water to a benzene hexachloride alcohol solution prior to or during the alcohol distillation and then separating the alcohol and water by fractional distillation in a suitabe column. During the evaporation the acid values are transferred to the aqueous phase which is separated from the benzene hexachloride at the completion of the distillation. Both benzene hexachloride and the recovered alcohol are essentially acid-free. Probably, the most important advantage accruing from the use of my process is that corrosion in processing equipment is considerably minimized with the result that plant shut-downs are very infrequent. Long continuous operation without shut-downs because of equipment failure materially assists in obtaining low manufacturing costs.

In a variation of my proces, water is added to the benzene hexachloride-alcohol-hydrochloric acid mixture, and a separation of alcohol from the benzene hexachloride, such as by extraction, evaporation or steam distillation without fractionation, is made. This procedure provides an alcohol-water-hydrochloric acid mixture as one product and a residual-benzene-hexachloride-water-hydrochloric acid phase. Thereafter, the alcohol-water-hydrochloric acid mixture is fractionated to produce anhydrous acid-free alcohol and dilute hydrochloric acid. Further treatment of the benzene hexachloride will remove additional amounts of hydrochloric acid.

One of the most unobvious benefits in my invention is the fact that water is added to an acidic alcohol with which it is miscible in order to obtain an alcohol product which is both water-free and acid-free. While it would appear on first glance that the addition of water to an alcohol would be a dilution of the same and hence would be an added cost in its recovery, actually the added water facilitates the separation of the alcohol and its recovery in a concentrated and essentially acid free form. Another benefit accruing from the practice of my invention is that the alcohol is recovered at greater efficiency than if the water were not present. The reason for this is that the water will act as a vehicle to carry the last traces of alcohol away from the benzene hexachloride.

In the practice of my invention a benzene-hexachloride methanol solution or mixture containing acid is charged to a still to which is attached a distillation column. The distillation column is provided with plates or is packed in a suitable manner to supply theoretical fractionation plates. The distillation column is also equipped with a condenser and reflux controller which directs a portion of the condensed material back into the distillation column and a second portion into a product receiver. Water is added to the benzene hexachloride-methanol-acid mixture either in the liquid form prior to distillation, or it can be added advantageously as a vapor prior to or during distillation. When the water is added in the form of vapor, less heat is needed to be supplied to the still than is the case when water is added as a liquid. The concentration of the benzene hexachloride in the methanol solution mixture is not important, and any mixture of benzene hexachloride and methanol can be purified using my invention.

The amount of water added to the benzene hexachloride-methanol-acid mixture, either in the form of liquid or as a vapor, is not important; it being necessary only that sufficient water be present to leave a large residual layer in the still following the distillation of the mehanol itself. The residual water phase or layer is necessary to dissolve the hydrochloric acid originally present in the benzene hexachloride-methanol mixture. The original charge of benzene hexachloride methanol may be as a solution or it may be in the form of a slurry. Either form will work satisfactorily in practicing my invention. Construction materials useful in practicing my invention for the still, distillation column, and condenser can be of glass or other materials of construction such as carbon and graphite or Teflon or Kel-F lined equipment. As mentioned previously, the distillation column can be either of the tray type or packed type, it only being necessary that sufficient actual or theoretical plates be present to satisfactorily separate the methanol from the water vapor.

In the operation of the still, the methanol-benzene hexachloride mixture is added to the still, and heat is supplied. Water can be added before or after the introduction of the benzene hexachloride-methanol mixture either as a liquid or as a vapor. The heat input is continued and the still temperature is allowed to rise until a vigorous boil-up in the column is obtained. When the vapor reaches the condenser the reflux distributor is controlled so that total reflux is obtained until the vapor overhead temperature is that of essentially pure methanol. When this temperature is obtained, the reflux ratio is varied to permit some withdrawal of methanol as a product stream. This withdrawal is continued and the rate of withdrawal may be increased so long as the overhead vapor temperature remains that of pure methanol. When it no longer becomes practical to increase the reflux ratio and as the boiling point of the product stream begins to rise above that of pure methanol, the product receiver is changed and an intermediate fraction of methanol and water is taken until all of the methanol is removed from the distillation system.

When all of the methanol has been distilled from the distillation system, the heat is turned off and the column and still allowed to cool so that the molten benzene hexachloride and the water containing the hydrochloric acid would coalesce and form respective liquid layers, the benzene hexachloride being the bottom layer. After the respective layers have coalesced, the benzene hexachloride is withdrawn by decantation leaving the water containing the hydrochloric acid. The molten benzene hexachloride is then directed to other processing operations or it may be introduced to conventional flaking equipment. The water containing the hydrochloric acid can be disposed of by neutralizing with alkaline materials under conventional means.

While the separation of the water and benzene hexachloride has been described as the stratification of immiscible materials which are separated by decantation, it is to be understood that other known processes for the separation, such as centrifugation may be used.

It is thus evident from the above description that the methanol has been recovered from the benzene hexachloride-hydrochloric acid water mixture in an essentially acid-free and pure form. The alcohol-water product which was collected following the withdrawal of pure methanol from the distillation column (which contained a small percentage of water) is reintroduced into the next distillation so that eventually all of the methanol is recovered in anhydrous form as a first cut in the distillation.

While the above description of my invention has been made in terms of a methyl alcohol, benzene hexachloride, hydrochloric acid mixture, it is to be understood that the same procedure is equally applicable to the separation of ethyl alcohol from a similar mixture.

In the practice of my invention where water is not added in the liquid form but is added as a vapor the rate of input of the water vapor is regulated so that the distillation rate is controlled by this addition. A satisfactory rate is obtained when sufficient boil-up occurs so that both reflux and product streams can be secured in the proper ratios as described above.

The following examples are illustrative of my invention but are not intended to limit it in any manner whatsoever.

Example I 400 parts of methanol containing 172 parts of benzene hexachloride were charged to a glass still upon which was mounted a glass distillation column equipped with a condenser and reflux controller. The benzene hexachloride charged to the still had an acidity of 0.127% while the methanol had an acidity as hydrochloric acid of 0.001%. Steam was introduced to the still, the rate of steam being adjusted so that a vigorous boil-up of vapor reflux was obtained. A reflux controller was set to give total reflux until the overhead vapor reached that of 64.3°, thereafter the reflux ratio was set so that both product and reflux were obtained so long as the overhead temperature remained constant. The first cut collected at a temperature of 64.3–64.5° C. weighed 248.1 parts and its acidity as hydrochloric acid was less than 0.001%. The water content was 0.44% giving an alcohol quality of greater than 99.5% methanol.

A second methanol cut collected at 64.8° C. weighed 120 parts and had an acidity as hydrochloric acid of less than 0.001%. Its water content was 0.66%. Thus the alcohol content of the second cut was better than 99.3% methanol. An intermediate cut weighing 25 parts was collected which had an acidity as hydrochloric acid of 0.009% and a methanol content of 78.5%. This latter cut was subsequently returned to the still for further distillation.

After distillation, the material in the reboiler was allowed to coalesce whereby two layers were formed. The water layer contained 741 parts in which the acidity as hydrochloric acid was 0.036%. This water was removed from the still, its acid neutralized and the materials discarded. The residual benzene hexachloride layer in the still weighed 167 parts and its acidity as hydrochloride was 0.002%. Thus, it is noted that the acidity of the benzene hexachloride had been reduced from 0.12% to 0.002%. This represents a reduction of 98.4% of the initial acid in the benzene hexachloride.

The second example was run in the same equipment as in Example I. The following materials were intorduced and collected.

Example II 400 parts of methanol containing 172 parts of benzene hexachloride were charged to the still. The benzene hexachloride had an acidity as hydrochloric acid of 0.127% while the methanol had an acidity as hydrochloric acid less than 0.001%. The mixture was distilled, and the first methanol cut containing 366 parts was obtained. The first methanol cut had an acidity of hydrochloric acid of less than 0.001% while its water content was 0.47%. A second methanol cut of only 20 parts was collected which had an acidity of hydrochloric acid of less than 0.001% and a water content of 0.82%.

An intermediate cut of 16 parts was collected which had an acidity of hydrochloric acid of 0.003% and a methanol content of 79.3%.

The water layer remaining in the reboiler after distillation contained 585 parts with an acidity of 0.043%. The residual benzene hexachloride weighed 169 parts and had an acidity of hydrochloric acid of 0.002%.

The initial water content of the methanol in both examples was 0.44%.

In both of the above examples the benzene hexachloride product was of a sparkling white color and represented a considerable improvement over that of its initial gray color.

The methanol collected in the product stream represents a recovery of 96.8% of methanol in the first example and a 99.8% recovery of methanol in the second example.

The recovered benzene hexachloride contained 0.002% hydrochloric acid in Example I and .002% hydrochloric acid in Example II. The recovery of benzene hexachloride was 97.8 and 98.3% in Examples I and II respectively.

While the above invention has been described in terms of a batch distillation process, my invention is equally applicable to continuous operation in which case the only major modification is the separation of the benzene hexachloride from the water is external of the distillation equipment.

Having now described my process, I claim:

1. The process for the removal of hydrochloric acid from acid benzene hexachloride alcohol mixtures in which the alcohol is selected from the group consisting of methyl and ethyl which comprises distilling the acid benzene hexachloride alcohol mixture in the presence of water under reflux conditions, withdrawing substantially all of the alcohol as a vapor from the said distilling mixture, discontinuing the said distillation and thereafter separating the residual benzene hexachloride from the residual aqueous acid material.

2. The process of claim 1 at a temperature at which the benzene hexachloride is molten.

3. The process of claim 1 in which the alcohol is methyl.

4. The process of claim 1 in which the water is introduced in the form of a vapor.

5. The process for the removal of hydrochloric acid from acid benzene hexachloride alcohol mixtures in which the alcohol is selected from the group consisting of methyl and ethyl which comprises distilling the acid benzene hexachloride alcohol mixture in the presence of water under reflux conditions, and at a temperature at which the benzene hexachloride is molten, withdrawing substantially all of the alcohol as a vapor from the said distilling mixture, thereafter discontinuing the said distillation and allowing the residual still liquor to separate into an aqueous acid layer and a benzene hexachloride layer and separating the said aqueous layer from the said benzene hexachloride.

6. The process of claim 5 in which the alcohol is methyl.

7. The process for removal of hydrochloric acid from an acid benzene hexachloride alcohol mixture in which the alcohol is selected from the group consisting of methyl and ethyl which comprises subjecting the acid benzene hexachloride alcohol mixture to contact with water, separating an acid-water-alcohol phase from a residual acid benzene hexachloride water phase, fractionally distilling the acid-water-alcohol phase under reflux conditions and collecting an alcohol distillate.

8. The process of claim 7 in which the alcohol is methyl.

9. A continuous process for the removal of hydrochloric acid from acidic benzene hexachloride alcohol mixtures in which the alcohol is selected from the group consisting of methyl and ethyl which comprises introducing a mixture of benzene hexachloride, alcohol and hydrochloric acid into a distillation column, introducing water into the said distillation column, applying heat to distill the said aqueous mixture, removing alcohol as a vapor from the said distillation column, condensing a portion of the alcohol vapor and returning it as reflux to the distillation column, withdrawing the remainder of the condensed alcohol as a product stream, removing from the bottom of the distillation column molten benzene hexachloride and water, and separating the withdrawn benzene hexachloride from the water.

References Cited in the file of this patent

UNITED STATES PATENTS

| | | |
|---|---|---|
| 2,603,664 | Burrage | July 15, 1952 |
| 2,674,569 | Burrage et al. | Apr. 6, 1954 |
| 2,691,625 | Clarke | Oct. 12, 1954 |
| 2,740,818 | Nicolaisen | Apr. 3, 1956 |